United States Patent
Sekiya et al.

(10) Patent No.: US 7,828,125 B2
(45) Date of Patent: Nov. 9, 2010

(54) SYSTEM FOR CONTROLLING ELECTRIC DEVICE

(75) Inventors: Shigenobu Sekiya, Wako (JP);
Tomoyuki Ichikawa, Yokohama (JP);
Naoki Iwagami, Yokohama (JP)

(73) Assignees: Honda Motor Co., Ltd., Tokyo (JP);
Honda Elesys Co., Ltd., Yokohama-shi (JP)

( * ) Notice: Subject to any disclaimer, the term of this patent is extended or adjusted under 35 U.S.C. 154(b) by 562 days.

(21) Appl. No.: 11/847,785

(22) Filed: Aug. 30, 2007

(65) Prior Publication Data

US 2008/0211153 A1    Sep. 4, 2008

(30) Foreign Application Priority Data

Sep. 11, 2006    (JP)    ............... 2006-245779

(51) Int. Cl.
*F16F 15/03* (2006.01)

(52) U.S. Cl. ..................... 188/267; 280/5.507

(58) Field of Classification Search .............. 280/5.507, 280/5.5, 5.508, 5.503; 188/267; 267/64.16, 267/274
See application file for complete search history.

(56) References Cited

U.S. PATENT DOCUMENTS 6,114,777 A * 9/2000 Hermann ................... 307/10.1
6,926,288 B2 * 8/2005 Bender ...................... 280/5.507

FOREIGN PATENT DOCUMENTS

JP    2001-128489    5/2001
JP    2006-077789    3/2006

* cited by examiner

*Primary Examiner*—Melanie Torres Williams
(74) *Attorney, Agent, or Firm*—Rankin, Hill & Clark LLP (57) ABSTRACT

A system for controlling an electric device comprises: a power supply for supplying electric power to an electric device; switch portion connected between the power supply and the electric device for controlling the electric power supplied to the electric device; an LC filter disposed between the switch portion and the electric device; and current detection portion for detecting an electric current supplied to the electric device.

13 Claims, 8 Drawing Sheets

SYSTEM FOR CONTROLLING ELECTRIC DEVICE

TECHNICAL FIELD

The present invention relates to a system for controlling an electric device, and more specifically relates to a technology for suppressing electromagnetic interference by using an LC filter while avoiding decrease in detection accuracy and durability of a current detection portion.

BACKGROUND OF THE INVENTION

A suspension is an important element of a motor vehicle and significantly influences the traveling stability and riding comfort of the motor vehicle. The suspension mainly consists of a link (arm, rod and the like) for supporting a tire to a vehicle body in a vertically moveable fashion, a spring for absorbing an impact from a road surface by deformation, and a damper for damping the vertical oscillation of the vehicle body. As a damper in such a suspension system, a so-called cylinder-type damper is widely used. A cylinder-type damper mainly consists of a cylinder tube filled with a hydraulic oil and a piston rod having a piston at its end, wherein the piston is received in the cylinder in a slidably moveable fashion and the hydraulic oil is adapted to move among a plurality of oil chambers in response to the movement of the piston.

Recently, in an effort to improve the performance of the cylinder-type damper, a variable damping force damper for variably controlling the damping force depending on a dynamic state of a motor vehicle has been developed. The variable damping force damper was mainly embodied as a mechanical-type damper in which the piston is provided with a rotary valve for varying an orifice area and the rotary valve is rotatably driven by an actuator. However, in order to simplify the structure and improve the operation response, it has been proposed to use a Magneto-Rheological fluid (MRF) as the hydraulic oil and control the viscosity of the MRF by using a magnetic fluid valve provided to the piston (see Japanese Patent Application Laid-Open Publication No. 2006-77789, for example). In the variable damping force damper of this type, an electric current supplied to the magnetic fluid valve is detected by a current detection circuit and a feedback control is conducted based on the result of the current detection.

In the variable damping force damper using MRF, a pulse width modulation (PWM) switch circuit is typically used to control the damping force by increasing or decreasing the electric current supplied to the magnetic fluid valve. As a result, electromagnetic noises having frequencies of multiples of the PWM signal frequency (e.g., 20 kHz) are generated from the wirings for conducting electric current supplied from the control device to the variable damping force damper, and the electromagnetic noises can interfere with radio signal reception or the like. For such reasons, the inventors conceived providing an LC filter consisting of an inductor and capacitor at a downstream of the PWM switch circuit to reduce the electromagnetic noises higher than a prescribed frequency.

However, a resonance at a certain frequency cannot be avoided in the LC filter, and as a result, the current detection circuit may be applied with a signal beyond its detection range and this can lead to inaccurate current detection or decrease in durability of the current detection circuit. Further, in the case where the resonance of the LC filter occurs at a frequency near the control frequency of the variable damping force damper, the control can be disturbed by the resonance and this can unfavorably affect the behavior of the motor vehicle.

BRIEF SUMMARY OF THE INVENTION

The present invention is made to solve the above problems in the prior art, and the primary object of the invention is to provide a system for controlling an electric device that can suppress electromagnetic interference.

A second object of the present invention is to provide a system for controlling an electric device that can suppress electromagnetic interference by using an LC filter while avoiding decrease in the detection accuracy and durability of a current detection portion.

To achieve such an object, according to one aspect of the present invention, there is provided a system for controlling an electric device, comprising: a power supply for supplying electric power to an electric device; switch portion connected between the power supply and the electric device for controlling the electric power supplied to the electric device; an LC filter disposed between the switch portion and the electric device; and current detection portion for detecting an electric current supplied to the electric device.

According to such a structure, the LC filter can reduce the electromagnetic noises higher than a prescribed frequency and thereby suppress the electromagnetic interference caused by the electromagnetic noises.

Preferably, the current detection portion is provided between the switch portion and the LC filter. In this way, even when the LC filter undergoes resonance, the resonance can be dampened within the electric device and thus the current detection portion will not be applied with a signal beyond its detection range, whereby the decrease in the detection accuracy and durability of the current detection portion can be avoided.

In one embodiment, the switch portion may consist of a pulse width modulation circuit operating at a prescribed drive frequency, and the current detection portion may output an accumulated value of the electric current supplied to the electric device at an output frequency lower than the drive frequency. In such a structure, a capacitor in the LC filter may store and discharge electric current along with turning on/off of the switch portion but the accumulated value of the electric current that is output from the current detection portion may not be affected by the electric current stored to and discharged from the capacitor.

Preferably, the LC filter may be adapted to have a resonance point set at a frequency lower than the drive frequency of the switch portion. Thus, because the drive frequency of the switch portion and the resonance frequency do not correspond to each other, disturbance that would be caused to the control of the electric device can be avoided.

In one embodiment, the LC filter may be adapted to attenuate frequencies higher than 10 kHz and have a resonance point at a frequency near 10 kHz. Such a resonance frequency is much higher than a usual control frequency of the electric device (0-20 Hz for a variable damping force damper, for example), and thus it is ensured that the resonance of the LC filter does not unfavorably affect the control of the electric device. Further, the attenuation of frequencies higher than 10 kHz can effectively prevent the interference with AM radio and FM radio reception.

The electric device may consist of an electrically controlled variable damping force damper provided to each one of right and left suspensions of a motor vehicle for damping vertical oscillations of a tire supported by the suspension. In such a case, control of the variable damping force damper can be conducted at a higher precision substantially without being affected by the resonance of LC filter.

According to another aspect of the present invention, there is provided a method for controlling an electric device that is supplied with electric power from a power supply via a switch portion and an LC filter, where a current detection portion for detecting an electric current supplied to the electric device is provided between the switch portion and the LC filter and the switch portion consists of a pulse width modulation circuit operating at a prescribed drive frequency, the method comprising the steps of: outputting an accumulated value of the electric current supplied to the electric device at an output frequency lower than the drive frequency by using the current detection portion; and controlling the pulse width modulation circuit based on the accumulated value of the electric current supplied to the electric device.

In this way, the LC filter can suppress electromagnetic noises related to turning on/off of the switch circuit (pulse width modulation circuit) and even if the LC filter undergoes resonance, the current detection portion will not be undesirably affected by the resonance because the current detection portion is located at an upstream of the LC filter. Further, in such a structure, a capacitor in the LC filter may store and discharge electric current along with turning on/off of the switch portion but the accumulated value of the electric current output from the current detection portion may not be affected by the electric current stored to and discharged from the capacitor. Thus, controlling the pulse width modulation circuit based on the accumulated value of the electric current can allow accurate control of the electric current actually supplied to the electric device.

BRIEF DESCRIPTION OF THE DRAWINGS

Now the present invention is described in the following with reference to the appended drawings, in which.

DETAILED DESCRIPTION OF THE PREFERRED EMBODIMENTS

Now, the present invention is described in detail in terms of a concrete embodiment in which the present invention is applied to a rear suspension system of a four-wheel motor vehicle.

Figure 1:
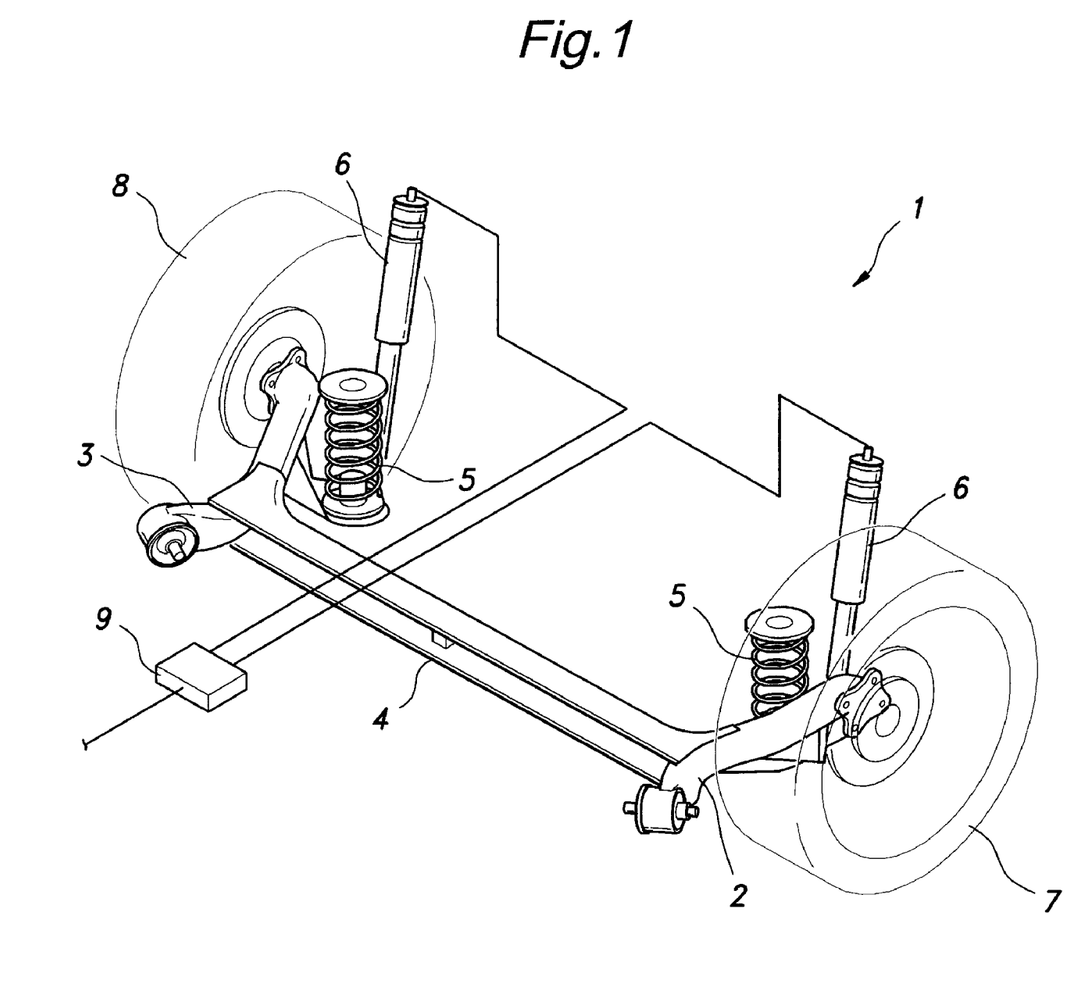
FIG. 1 is a general structural view showing a rear suspension system of a four-wheel motor vehicle regarding an embodiment of the present invention.
Figure 2:
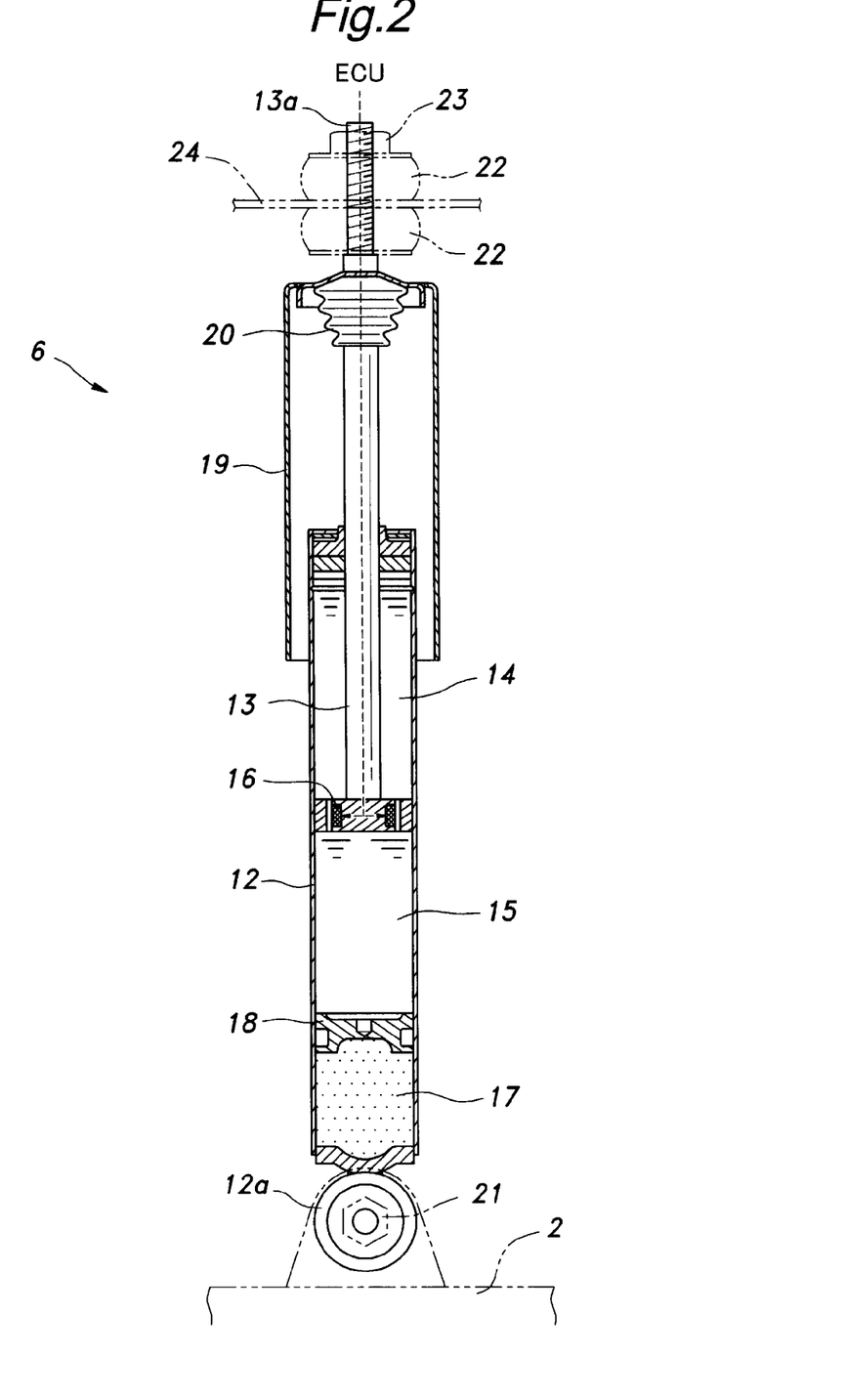
FIG. 2 is a longitudinal cross-sectional view of a damper regarding an embodiment of the present invention.
Figure 3:
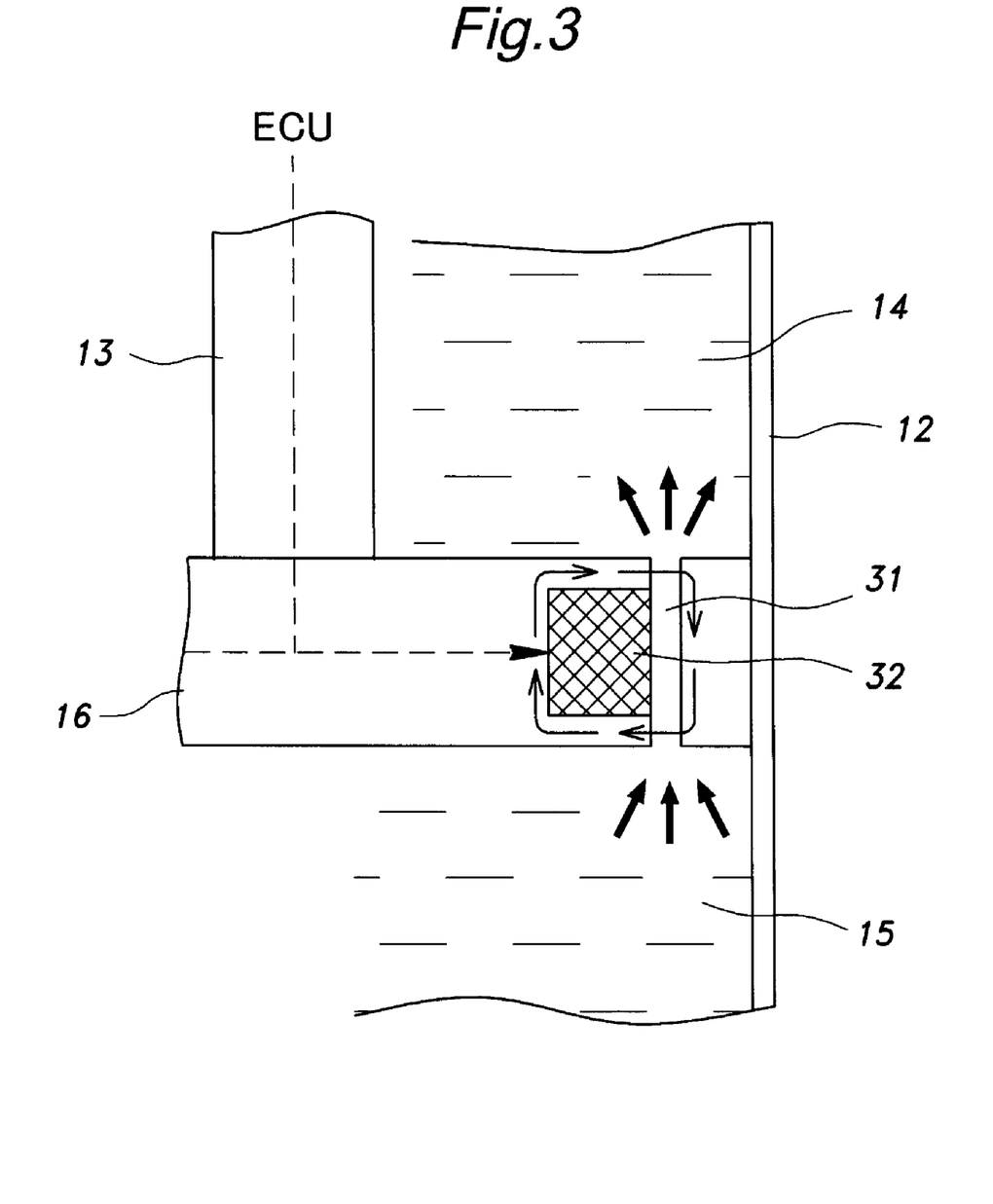
FIG. 3 is a general structural view of an MLV regarding an embodiment of the present invention.
Figure 4:
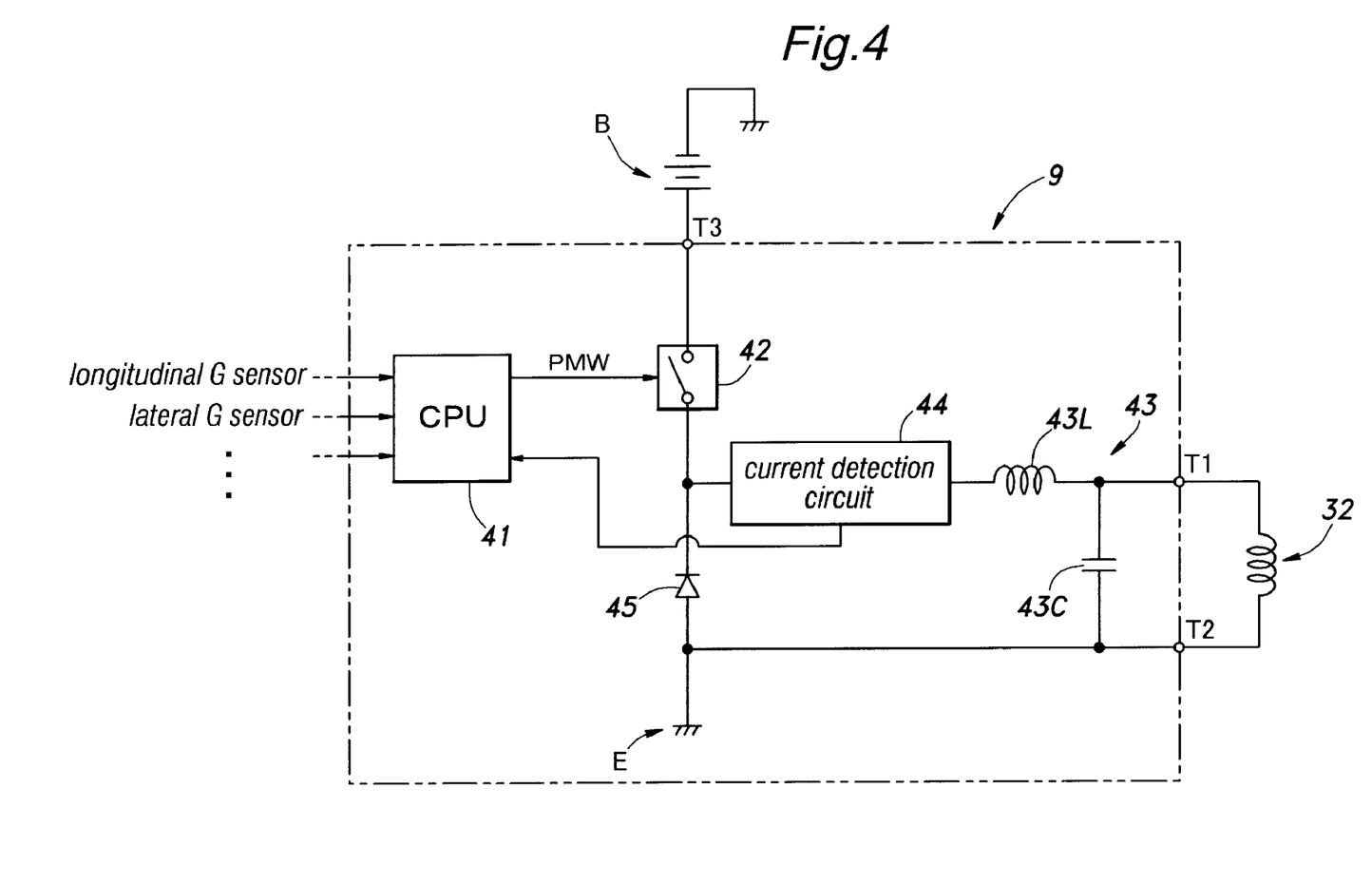
FIG. 4 is a structural view of an essential part of a damper control circuit regarding an embodiment of the present invention.

FIG. 1 is a perspective view of the rear suspension system, FIG. 2 is a longitudinal cross-sectional view of a damper, FIG. 3 is a general structural view of an MLV (Magnetizable Liquid Valve), and FIG. 4 is a structural view of an essential part of a damper control circuit according to an embodiment of the present invention.

<Suspension>

As shown in FIG. 1, a rear suspension 1 of this embodiment of the present invention consists of a so-called H-shaped torsion beam suspension, comprising: left and right trailing arms 2, 3; a torsion beam 4 connecting middle portions of the trailing arms 2, 3 to each other; left and right coil springs 5 serving as suspension springs; and left and right dampers 6 provided on either side, to whereby support left and right rear wheels 7, 8. Each damper 6 consists of a variable damping force damper having an MRF (Magneto-Rheological Fluid) as a hydraulic oil, and its damping force is controlled by an ECU 9 which may be disposed in a trunk room or the like.

<Damper>

As shown in FIG. 2, the damper 6 of this embodiment of the invention is a mono-tube type (De-Carbon type), and comprises: a cylinder tube 12 filled with MRF; a piston rod 13 slidably moveable in an axial direction with respect to the cylinder tube 12; a piston 16 attached to an end of the piston rod 13 to divide the space within the cylinder tube 12 into an upper oil chamber 14 and a lower oil chamber 15; a free piston 18 that defines a high-pressure gas chamber 17 at a lower portion of the cylinder tube 12; a cover 19 for preventing adhesion of dust to the piston rod 13, etc.; and a bump stop 20 serving as a buffer during a full bound.

The cylinder tube 12 is connected to an upper surface of the trailing arm 2, which is a wheel-side member, by means of a bolt 21 passed through an eyepiece 12a provided at a lower end of the cylinder tube 12. Further, an upper end stud 13a of the piston rod 13 is connected to a damper base (upper portion of a wheel house) 24, which is a vehicle body-side member, via upper and lower bushes 22 and a nut 23.

As shown in FIG. 3, the piston 16 is provided with a through-hole 31 connecting the upper oil chamber 14 and the lower oil chamber 15, and an MLV 32 installed in the through-hole 31. When an electric current is supplied from the ECU 9 to the MLV 32, a magnetic field (magnetic flux is shown by arrows in FIG. 3) is applied upon the MRF flowing through the through-hole 31, and this causes ferromagnetic particles in the MRF to form chain-shaped clusters, whereby increasing the apparent viscosity (simply referred to as viscosity hereinafter) of the MRF flowing through the through-hole 31.

<Damper Control Circuit>

As shown in FIG. 4, the ECU 9 of this embodiment of the invention comprises: a CPU 41 serving as a computation and control portion; a switch circuit (switch portion) 42; positive and negative connection terminals T1, T2, to which the MLV 32 is connected; an LC filter 43 provided between the switch circuit 42 and the connection terminals T1, T2; a current detection circuit 44 provided between the switch circuit 42 and the LC filter 43; a flywheel diode 45 connected between the ground E and an upstream side of the current detection circuit 44; and a power supply terminal T3, to which a battery power supply B is connected.

Figure 5:
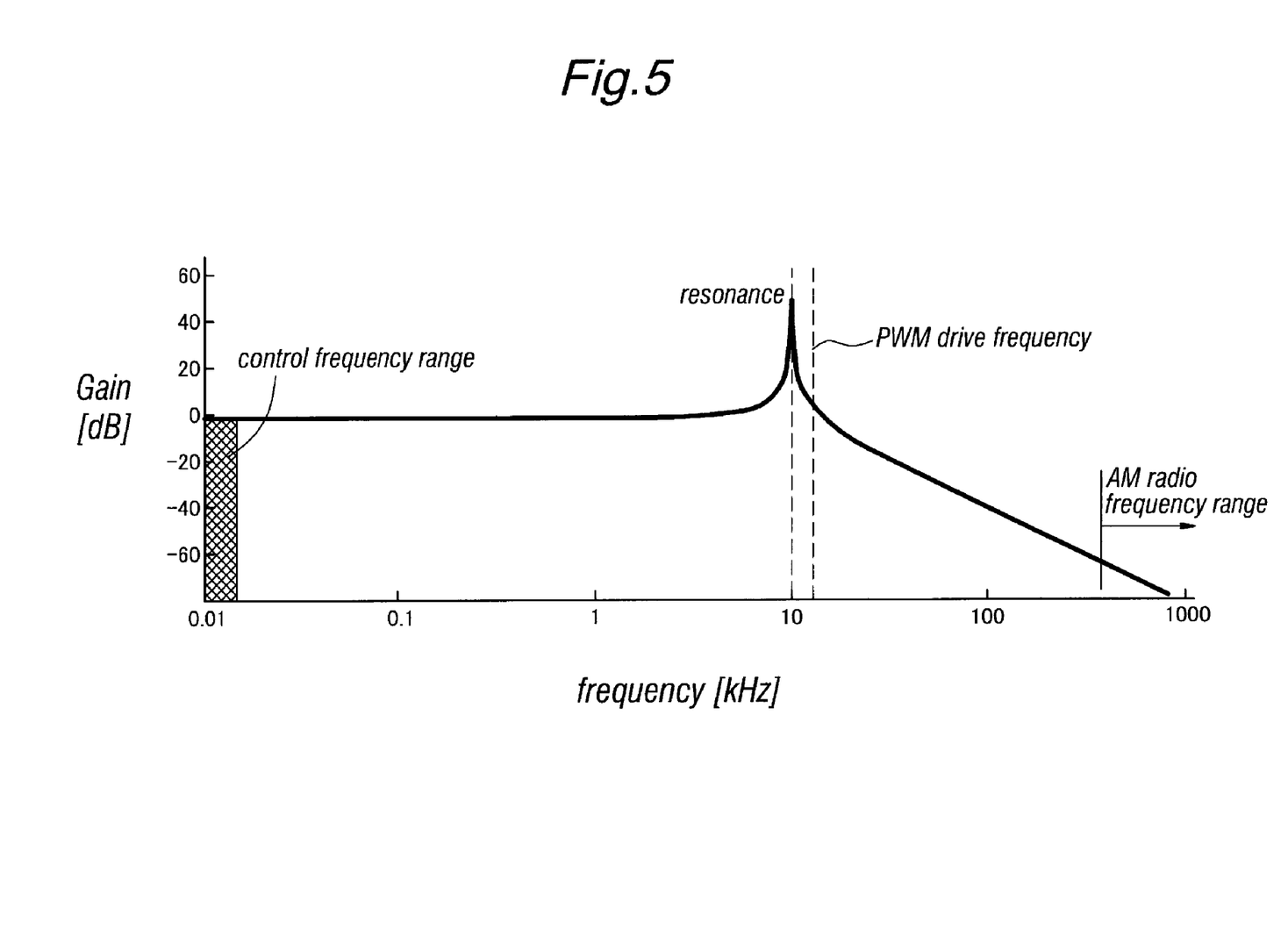
FIG. 5 is a graph showing the characteristics of an LC filter regarding an embodiment of the present invention.

The CPU 41 determines a target damping force for each of the left and right dampers 6 based on the traveling state of the motor vehicle, driver's steering actions and the like, and accordingly provides the switch circuit 42 with a PWM drive signal at a certain frequency (hereinafter referred to as a PWM drive frequency, which, in this embodiment, is 20 kHz). The LC filter 43 consists of an inductor 43L connected between the current detection circuit 44 and the connection terminal T1, and a capacitor 43C connected between an upstream side of the connection terminal T1 and a downstream side of the connection terminal T2, to whereby function is to smooth the electric current supplied from the switch circuit 42 to the MLV 32. As shown in FIG. 5, the LC filter 43 is adapted to attenuate the frequency higher than about 10 kHz and have a resonance point appearing in the vicinity of 10 kHz. The current detection circuit 44 may detect electric current by converting the electric current to voltage by using a shunt resistor and process the voltage through a differential amplification with offset as well as through reverse amplification, and may output an accumulated value of the electric current to the CPU 41 at a prescribed output frequency (2 Hz in this embodiment).

<Mode of Operation>

Once the motor vehicle starts running, the ECU9 sets a target damping force for each damper 6 (i.e., a target supply current to the MLV 32) based upon vehicle body accelerations obtained by a longitudinal (fore-and-aft) G sensor, lateral G sensor and vertical G sensor, vehicle body speed provided by a vehicle speed sensor, rotation speed of each wheel provided by wheel speed sensors, and steering speed provided by a steering angle sensor, and then outputs a PWM drive signal to the switch circuit 42. Consequently, the switch circuit 42 repeatedly opens and closes at the frequency of the PWM drive signal, to thereby intermittently supply the MLV 32 with an electric current from the power supply terminal T3 to which the battery B is connected. Further, the ECU 9 feedback-controls the supply current (or PWM drive signal) based on the accumulated value of electric current that is input from the current detection circuit 44 at the output frequency.

Figure 6:
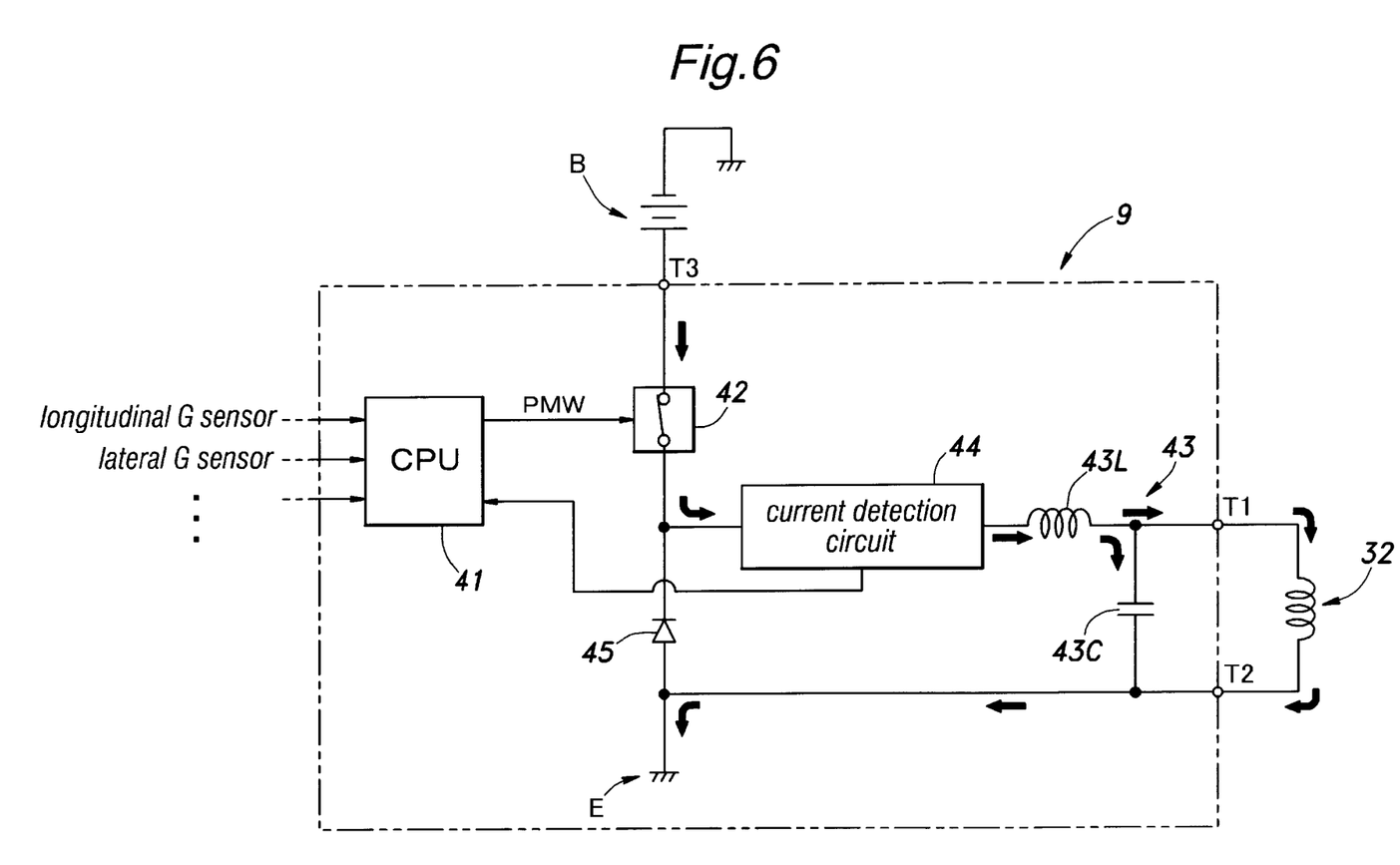
FIG. 6 is an explanatory view showing the flow direction of electric current when the switch circuit is closed.

In the present embodiment, when the switch circuit 42 is closed, the electric current from the power supply terminal T3 is supplied to the MLV 32 via the current detection circuit 44 and the inductor 43L of the LC filter 43, and then flows to the ground E after exciting the MLV 32, as indicated by arrows in FIG. 6. In this phase, part of the electric current is stored by the capacitor 43C of the LC filter 43 as electric charge, and as a result, the electric current detected by the current detection circuit 44 is larger than that actually supplied to the MLV 32.

Figure 7:
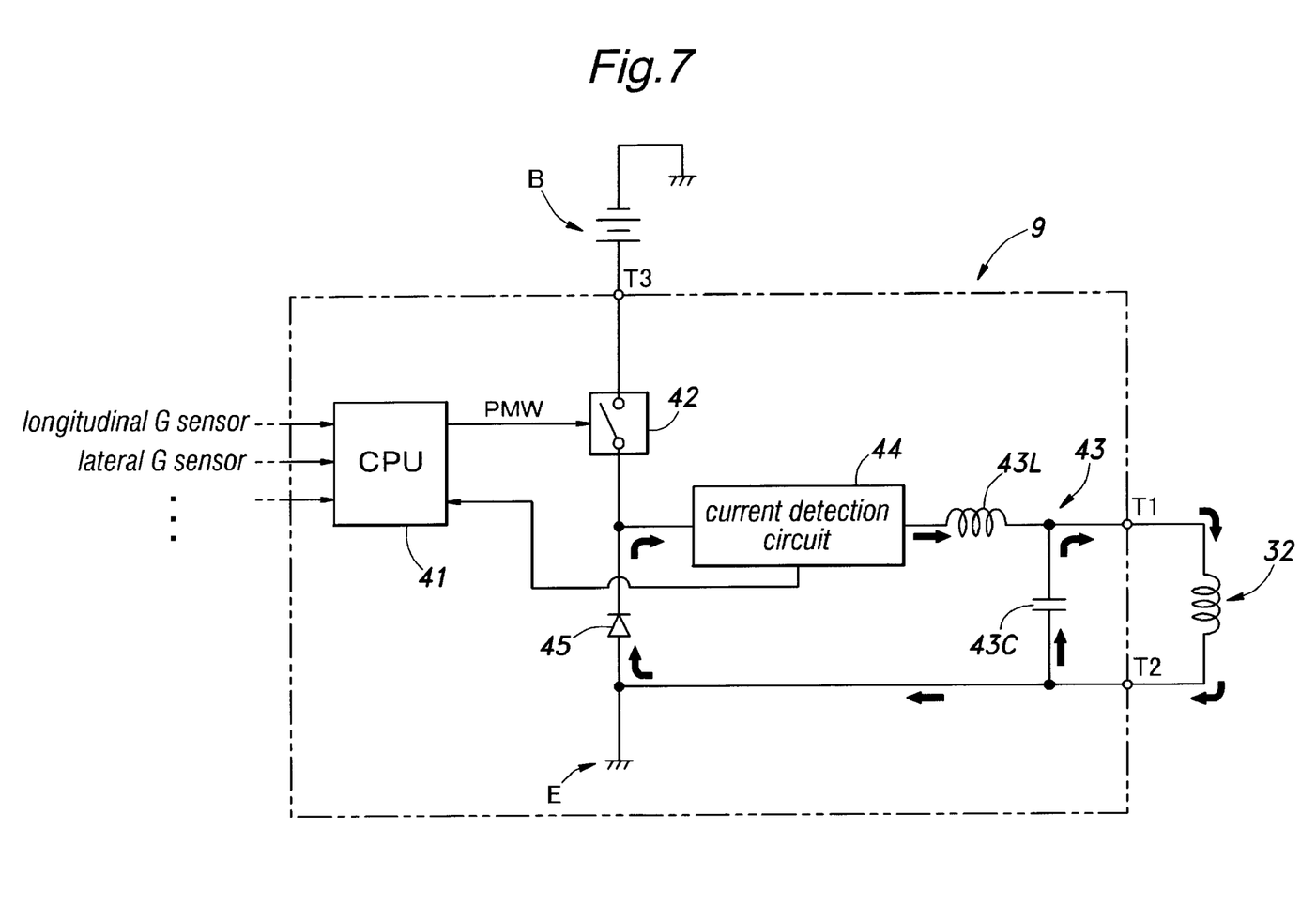
FIG. 7 is an explanatory view showing the flow direction of electric current when the switch circuit is open.

On the other hand, when the switch 42 is open, due to the inductance of MLV 32 (or coils), the electric current circulates through the flywheel diode 45, current detection circuit 44 and inductor 43L of the LC filter 43 before returning to the MLV 32 while gradually decreasing in amplitude, as indicated by arrows in FIG. 7. At the same time, the electric charge stored in the capacitor 43C of the LC filter 43 is also provided to the MLV 32 as an electric current. The MLV 32 is thus kept excited by these electric currents.

In the illustrated embodiment, the above described structure allows the resonance of the LC filter 43 to be absorbed by the MLV 32 and therefore the current detection circuit 44 will not be applied with a signal exceeding its detection range, whereby the problems such as inaccurate current detection or decrease in durability of the current detection circuit 44 can be avoided. It should be noted that when the switch circuit 42 is closed, the current detection circuit 44 detects the electric current that is an addition of the electric current flowing into the capacitor 43C and the electric current supplied to the MLV 32, while when the switch circuit 42 is open, the current detection circuit 44 detects the electric current resulting from subtraction of the electric current discharged from the capacitor 43C from the electric current supplied to the MLV 32. However, because the electric current flowing into and stored by the capacitor 43C when the switch circuit 42 is closed is the same as the electric current discharged from the capacitor 43C when the switch circuit 42 is open and the output frequency of the current detection circuit 44 is much lower than the opening/closing frequency of the switch circuit 42 (i.e., PWM drive frequency), the accumulated value of electric current that is output from the current detection circuit 44 to the CPU 41 can be equal to the electric current actually supplied to the MLV 32, and thus the above feedback control can be conducted appropriately.

On the other hand, the LC filter 43 of the present embodiment is adapted to attenuate the frequencies over 10 kHz and have a resonance point near 10 kHz. Therefore, as shown in FIG. 5, there is no reduction in the gain for the frequencies of damping force control (in this embodiment, 0-20 Hz), and thus unfavorable affects to the vehicle behavior can be avoided. Further, because the LC filter 43 is adapted to resonate at a frequency lower than the PWM drive frequency of the switch circuit 42 (in this embodiment, 20 kHz), the PWM drive frequency and the resonance frequency do not coincide to each other and it is possible to reduce the gain for the PWM drive frequency and attenuate the frequencies of multiples of PWM drive frequency, thereby effectively preventing the interference with AM radio broadcast (at frequencies from 531-1602 kHz, for example) and FM radio broadcast (at frequencies 76-90 MHz, for example).

Figure 8:
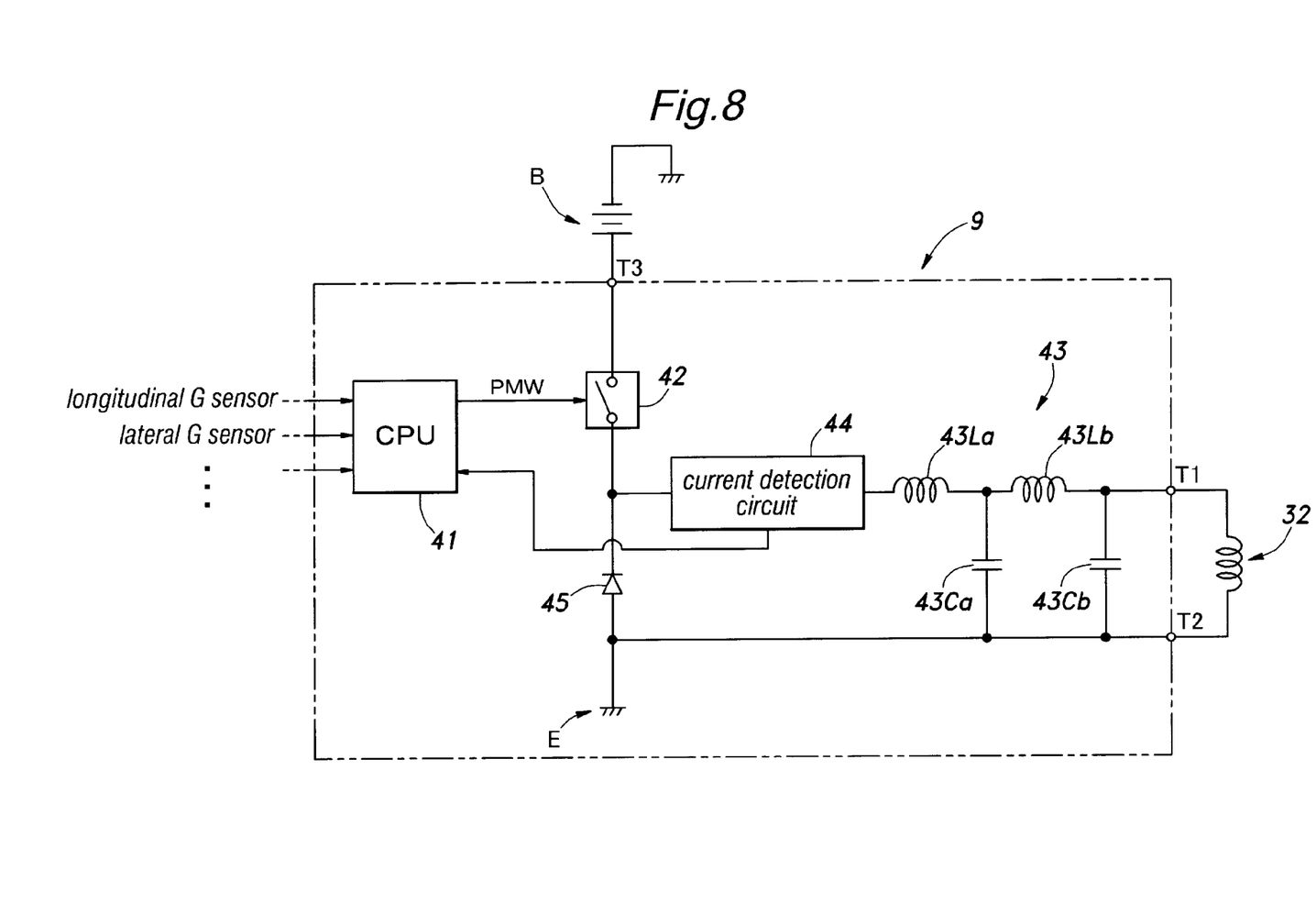
FIG. 8 is a view showing a modified embodiment of the LC filter.

The present invention has been described above in terms of concrete embodiments thereof but the present invention should not be limited to these embodiments. For example, in the above embodiment, the present invention was applied to the control circuit of a variable damping force damper using a Magneto-Rheological fluid, but the present invention may be applied to a control circuit for a variable damping force damper of other types or control circuit for an electric device other than the variable damping force damper. Further, although the above embodiment used an LC filter containing a single inductor and a single capacitor, the LC filter may not be limited to that. As shown in FIG. 8, the LC filter 43 may contain two inductors 43La, 43Lb and two capacitors 43Ca, 43Cb, for example. Also, in the above embodiment, the LC filter is adapted to attenuate frequencies over 10 kHz and have a resonance point at around 10 kHz, but it may have other attenuation frequency range and resonance point. Other concrete features of the control circuit, suspension and/or variable damping force damper may be altered or modified so long as they do not exceed the scope of the present invention.

The present application is based on, and claims priority from, Japanese Patent Application No. 2006-245779 filed on Sep. 11, 2006, the disclosure of which is hereby incorporated by reference herein in its entirety.

The invention claimed is:

1. A system for controlling an electric device, comprising:
a power supply for supplying electric power to an electric device;
switch portion connected between the power supply and the electric device for controlling the electric power supplied to the electric device;
an LC filter disposed between the switch portion and the electric device; and
a current detection portion for detecting an electric current supplied to the electric device,
wherein the switch portion consists of a pulse width modulation circuit operating at a prescribed drive frequency and the current detection portion outputs an accumulated value of the electric current supplied to the electric device at an output frequency lower than the drive frequency.

2. The system for controlling an electric device according to claim 1, wherein the current detection portion is provided between the switch portion and the LC filter.

3. The system for controlling an electric device according to claim 1, wherein the LC filter is adapted to have a resonance point set at a frequency lower than the drive frequency of the switch portion.

4. The system for controlling an electric device according to claim 3, wherein the LC filter is adapted to attenuate frequencies higher than 10 kHz and have a resonance point at a frequency near 10 kHz.

5. The system for controlling an electric device according to claim 1, wherein the electric device consists of an electrically controlled variable damping force damper provided to each one of right and left suspensions of a motor vehicle for damping vertical oscillations of a tire supported by the suspension.

6. A method for controlling an electric device that is supplied with electric power from a power supply via a switch portion and an LC filter, where a current detection portion for detecting an electric current supplied to the electric device is provided between the switch portion and the LC filter and the switch portion consists of a pulse width modulation circuit operating at a prescribed drive frequency, the method comprising the steps of:

outputting an accumulated value of the electric current supplied to the electric device at an output frequency lower than the drive frequency by using the current detection portion; and controlling the pulse width modulation circuit based on the accumulated value of the electric current supplied to the electric device.

7. The method according to claim 6, further comprising the step of setting a resonance point of the LC filter so as to be lower than the drive frequency of the switch portion.

8. The method according to claim 7, wherein the LC filter is adapted to attenuate frequencies higher than 10 kHz and have a resonance point at a frequency near 10 kHz.

9. The method according to claim 6, wherein the electric device consists of an electrically controlled variable damping force damper provided to each one of right and left suspensions of a motor vehicle for damping vertical oscillations of a tire supported by the suspension.

10. A system for controlling an electric device, comprising:

a power supply for supplying electric power to an electric device;

switch portion connected between the power supply and the electric device for controlling the electric power supplied to the electric device;

an LC filter disposed between the switch portion and the electric device; and a current detection portion provided between the switch portion and the LC filter for detecting an electric current supplied to the electric device, wherein the electric device consists of an electrically controlled variable damping force damper provided to each one of right and left suspensions of a motor vehicle for damping vertical oscillations of a tire supported by the suspension.

11. The system for controlling an electric device according to claim 10, wherein:

the switch portion consists of a pulse width modulation circuit operating at a prescribed drive frequency; and the current detection portion outputs an accumulated value of the electric current supplied to the electric device at an output frequency lower than the drive frequency.

12. The system for controlling an electric device according to claim 11, wherein the LC filter is adapted to have a resonance point set at a frequency lower than the drive frequency of the switch portion.

13. The system for controlling an electric device according to claim 12, wherein the LC filter is adapted to attenuate frequencies higher than 10 kHz and have a resonance point at a frequency near 10 kHz.

* * * * *